March 8, 1960 R. A. RATCLIFF 2,927,358

HOIST HOOK HAVING SPRING URGED GATE LATCHING MEANS

Filed May 21, 1957

INVENTOR.
Ralph A. Ratcliff
BY
Fryer & Johnson
Attorneys

United States Patent Office 2,927,358

Patented Mar. 8, 1960

2,927,358

HOIST HOOK HAVING SPRING URGED GATE LATCHING MEANS

Ralph A. Ratcliff, Belmont, Calif.

Application May 21, 1957, Serial No. 660,519

2 Claims. (Cl. 24—241)

This invention relates to hoist hooks of the conventional C-hook type and more particularly to the safety gate latching structure for such hooks. Although hoist hooks of the C-type having safety gates thereon have been known in the art heretofore, such prior art hooks frequently utilize relatively complicated latching means on the safety gates which often require the use of more than one hand to permit operating the latching means and moving the gate from the closed to the open position. The present invention involves a hook having safety gate latching mechanism which requires the use of only one hand to operate the gate latching mechanism and simultaneously to swing the gate to the open position.

Summarizing this invention, it comprises a conventional C-type hoist hook having improved safety gate latching mechanism mounted on the safety gate intended to close the throat opening of the hook. The safety gate is pivotally mounted to a portion of the hook body and incorporates a recessed outer end which is adapted to overlie the tip of the hook when the gate is in the closed position. In such closed position, any line, cable or other structure which is supported by the hook is precluded from accidental escape through the throat opening lying between the gate and the hook tip.

The latching mechanism embodied in this invention includes a spring urged dogging pin slidably carried on the safety gate. One end of the spring urged dogging pin extends toward the hook body and incorporates a latching end or dogging point which is adapted to be engaged with cooperating stop means formed on the hook body adjacent the throat opening when the safety gate is in the closed position. A handle member is secured to the opposite end of the slidable dogging pin whereby manual pressure may be applied to the handle to enable the latching end of the pin to be moved out of engagement with the stop shoulder means on the hook body against the urging of the spring, thereby simultaneously allowing the safety gate to be moved by the same hand to the open position in which the throat opening of the C-hook is unrestricted. Manual pressure may be applied to the handle member with the same hand used to move the safety gate from the closed position to the open position, thus leaving the other hand free so that the operator may also simultaneously use the other hand for whatever purpose desired.

From the preceding it is seen that this invention has as its objects, among others, the provision of an improved C-hook assembly having a safety gate which is adapted to be moved from a closed position to an open position, and vice versa, thereby restricting or opening the throat portion which exists between the tip of the hook and the shank portion of the hook body.

A further object of this invention is the provision of latching mechanism on a safety gate for a C-hook which may be operated with one hand and which eliminates the need to use a second hand to move the safety gate from a closed position to an open position.

A still further object of this invention is the provision of spring urged latching mechanism which is securely mounted on the safety gate of a C-type hook which automatically latches the safety gate in closed position and which readily may be unlatched to allow movement of the safety gate to an open position.

Yet another object of this invention is the provision of latching mechanism for a safety gate on a hoist hook which is simple in construction and which may be economically manufactured.

Other objects of this invention will become apparent upon reading of the remainder of the specification.

The accompanying drawings illustrate a preferred embodiment of the hook encompassing my invention.

Referring to the drawings:

Fig. 3 is on a slightly enlarged scale relative to Figs. 1 and 2.

Figure 1:
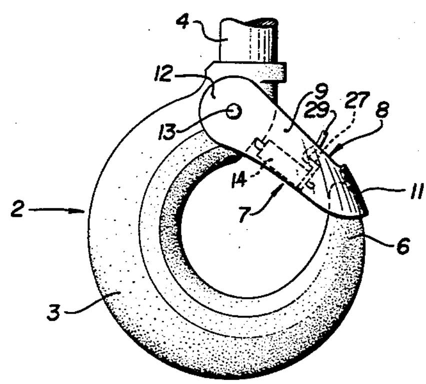
Fig. 1 is a side elevation of a C-type hoist hook showing the safety gate in closed position overlying the tip of the hook. The gate latching mechanism is shown in phantom lines and is positioned between the arms of the safety gate.

With reference to the preferred embodiment of the invention, the hoist hook assembly is generally designated 2 and comprises a conventional C-shaped hook body 3 which terminates adjacent one end in a shank portion 4. The shank portion 4 is adapted for engagement with a supporting structure to secure the hook in operative position. The manner in which the hook is secured to such supporting structure may vary depending on the particular use to which the hook is put. The upper end of the shank portion 4 may be formed with an upset enlarged head or, alternatively, the shank may be threaded and a conventional nut device may be secured on the threaded shank end after the shank has been inserted into the supporting structure. Other means of securing the shank portion 4 of the hook to a supporting structure also may be used and the two means mentioned above merely are illustrative of the numerous ways in which the hook may be secured in operative position.

The hook body 3 comprises a loop or bight portion which terminates at the end opposite the shank portion in a relatively pointed tip 6. The shape of the hook tip will depend on the particular use to which the hook is put. It should be understood, however, that various tip forms may be utilized. In the embodiment illustrated, the tip 6 is slightly inturned toward the shank portion 4. However, under certain situations it may be desirable to have the tip extend substantially vertical, that is, parallel to the shank portion, while in other situations it may be desirable to have the tip turned slightly outwardly away from the shank portion.

The tip 6 of the hook is spaced from the shank portion 4 and a throat opening 7 is produced therebetween which permits the insertion of a line, cable or other structure into the hook. To prevent removal or inadvertent escape of such line or cable from the hook body 3, a safety gate 8 is pivotally mounted on the hook.

Figure 2:
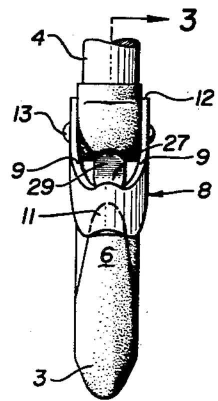
Fig. 2 is a front elevation of the hook showing the gate in closed position with the gate latching mechanism positioned between the arms of the gate.

Desirably, but not necessarily, the safety gate 8 is in the form of a sheet metal stamping which comprises two substantially parallel arms 9 (see Fig. 2), integrally connected at one end 11 but open and spaced at the opposite end 12. The open end 12 of the safety gate 8 straddles the hook body 3 adjacent the bottom of the shank portion 4. It should be understood that the safety gate 8 may be produced in any other convenient manner in addition to stamping, such as by casting.

Safety gate 8 is pivotally yet securely mounted to the hook body 3 by means of a conventional fastener. In the illustrated embodiment the fastener takes the form of a headed pin 13 in the hook body and upon which gate 8 is pivoted. However, if so desired, a rivet or conventional nut and bolt or similar type fastening device could be utilized to pivotally retain the safety gate on the hook. To permit mounting of the gate 8 on the hook body 3, aligned openings are formed through the body 3 as well as through the ends 12 of the substantially parallel gate arms 9. Because of its pivotal connection to the hook body 3, the safety gate 8 readily may be moved from the open position to the closed position, and vice versa, as shown in Fig. 4.

Figure 3:
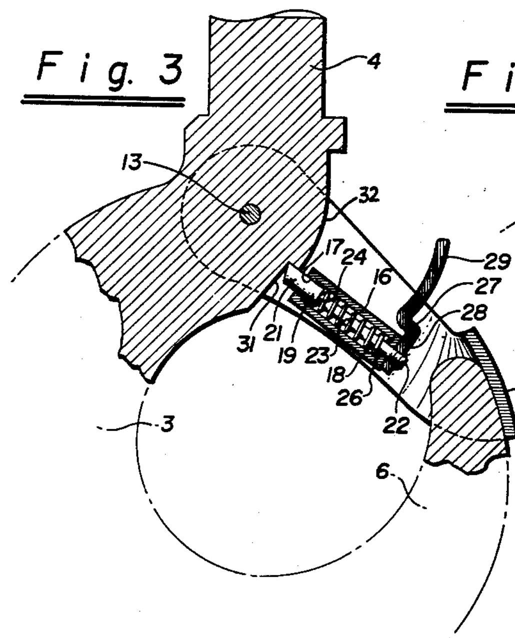
Fig. 3 is a partial vertical section of the hook, safety gate and latching mechanism taken in a plane indicated by line 3—3 of Fig. 2.
Figure 4:
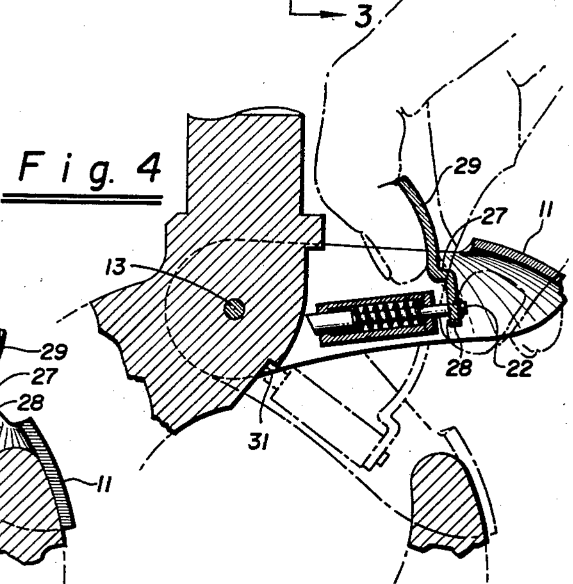
Fig. 4 is a partial vertical section similar to Fig. 3 wherein the open position of the gate is shown in solid section lines while the closed position is shown in phantom lines.

When the safety gate is in the closed position, as shown in Fig. 3 and in phantom lines in Fig. 4, it becomes necessary to latch the gate 8 in such position to preclude the inadvertent escape of a line or cable which is carried by the hook structure. To effect latching of the gate 8 in the closed position, spring urged latching mechanism, generally designated 14 in Fig. 1, is supported or mounted between the spaced, substantially parallel arms 9 of the safety gate 8.

Desirably the latching mechanism 14 includes a support 16 which is preferably in the form of a casing or housing mounted, such as by welding or brazing, in the space existing between the arms 9 of the gate 8. An aperture 17 is provided in one end of the casing 16 while the opposite end 18 of the casing is closed by an apertured plate to be described. An elongated latching or dogging pin 19 is slidably received in the casing with opposite ends 21 and 22 thereof extending beyond the ends of the casing 16. It should be noted that a dogging point is formed on the end 21 of the dogging pin 19.

Resilient means, desirably taking the form of a coil spring 23, is mounted within casing 16 and is carried on the dogging pin 19. An enlarged stop shoulder 24 is formed on pin 19 adjacent end 21 thereof for engagement with one end of coil spring 23 in a manner to be discussed hereinafter. After the spring 23 has been mounted on the pin 19, the opposite end of the casing is closed by any conventional means, but in the illustrated embodiment, a small closure plate 26 is secured to the casing 16 in any advantageous manner, such as by welding or brazing. The plate 26 which closes end 18 of the casing 16 is provided with an aperture through which the end 22 of the slidable latching or dogging pin 19 projects.

When the casing or support 16 has been closed in the manner indicated, the spring 23 contacts the closure plate 26 at one end and the stop shoulder 24 on the pin at its opposite end thereby urging the dogging end 21 of the pin 19 normally outwardly of the casing 16, for a purpose to become apparent.

In the preferred embodiment of this invention it is desirable to use an enclosed casing as part of the latching mechanism 14. An enclosed casing insures that dirt and foreign matter is prevented from entering the casing, thereby preventing fouling of the coil spring 23. However, under certain conditions an open support member will be adequate. Such an open support would only require the use of two apertured plates secured in spaced relation on gate 8 for slidable reception of the dogging pin and coil spring therebetween.

The end 22 of the pin 19 which projects through the closure plate 26 has secured thereto a small handle 27. In the embodiment illustrated the dogging pin 19 is externally threaded at end 22 and the handle 27 has an internally threaded aperture at one end 28 thereof in which the threaded end 22 of the pin is engaged. It should be understood, however, that any other conventional means could be utilized to secure the handle 27 to the pin end 22.

It should be noted that the projecting end 21 of the dogging pin 19 may be retracted into the casing 16 by movement of the handle 27 in a direction toward the closed end 11 of the safety gate 8 against the urge of the coil spring 23.

As clearly shown in Figs. 3 and 4 of the drawings, the handle 27 desirably is somewhat S-shaped, having one end 29 thereof extending upwardly through the open space between the arms 9 of the gate 8 and thence beyond the top of the safety gate 8 to provide a handle projecting portion above the gate top for ready engagement by a finger of the person using the hook. The other end 28 of handle 27 is a threadedly engaged with threaded end 22 of the dogging pin 19. The exact shape of the handle 27, however, may be varied without departing from the basic concepts of this invention.

To insure proper latching of the safety gate 8 in the closed position shown in Fig. 3, stop means, desirably in the form of a stop shoulder 31, is formed in the body 3 of the hook adjacent the throat opening 7. Desirably, the shape of the stop shoulder 31 is similar in configuration to the dogging point formed on the end 21 of the slidable dogging pin 19. The exact form of the stop shoulder 31, however, may be varied to meet a particular need.

As shown in the drawings, the dogging point formed on the end 21 of the slidable dogging pin 19 is securely engaged with the stop shoulder 31 formed on the body 3 of the hook when the gate 8 is in closed position, thereby precluding any upward movement of the safety gate 8. In such position the gate 8 positively closes the throat opening 7. Any substantial inadvertent movement of the safety gate 8 in any direction is precluded in that the gate 8 cannot be moved upwardly due to engagement of the slidable dogging pin 19 with the stop shoulder means 31 on the hook body, nor can the gate 8 be moved transversely because the end 11 of the gate is engaged over the free tip end 6 of the hook.

To move the safety gate 8 from the closed to the open position it is only necessary to utilize one hand. With reference to Fig. 4, gate 8 is opened in the following manner: by placing an index finger, or any other finger which may be more convenient to the particular operator, between the handle 27 and the shank portion 4 of the hook body 3, and exerting manual pressure on the handle 27, the handle may be moved towards the closed end 11 of the safety gate 8, thereby compressing the coil spring 23 between the shoulder 24 on pin 19 and the closure plate 26, and at the same time urging or retracting the pointed end 21 of the dogging pin 19 into the latching mechanism support casing 16. At the same time it is a simple matter for the operator to utilize the remainder of the same hand to swing the safety gate 8 upwardly to its open position, thereby freeing the throat opening 7 of all restriction.

The use of two hands to operate the safety gate of this invention is totally unnecessary. The use of only one hand is particularly important in that it leaves the other hand free for quick manipulation of the load carried by the hook. Furthermore, because of the readily accessible handle 27 which is remote from dogging end 21 of the latching pin 19, the danger of injury to the hand of an operator by being pinched in the latching mechanism is completely eliminated in the hook of this invention.

It should be noted that the portion of the hook body 3 which lies adjacent the throat opening 7 has a gradual taper or rounded surface 32 thereon. Because of the outward urging toward the hook body 3 by the coil spring 23 of the slidable dogging pin 19, the dogging point on end 21 of the pin 19 is able to ride on the rounded surface 32 of the hook body 3 as the gate 8 is moved from one position to another. Therefore, when the gate is moved from the open to the closed position, the end 21 of pin 19 rides on the rounded surface 32 until it reaches the point opposite the stop shoulder means 31 formed on the hook body 3. At this point the pin 19, under urging by the coil spring 23, automatically snaps into locking engagement with the stop shoulder 31 formed in the hook body. To latch safety gate 8, therefore, it is unnecessary to operate manually the latching mechanism in that the gate is automatically latched as it is pivoted to the closed position.

The automatic latching feature of this hook is particularly advantageous in that the gate 8 is securely latched in closed position without the necessity of any additional action on the part of the workman utilizing the hook. The safety gate 8 can be moved from the closed or latched position simply by utilizing the procedure described previously, namely, by applying pressure to the handle 27 with one hand, thereby withdrawing the dogging point of the slidable pin 19 from engagement with the stop shoulder 31 on the hook body 3, and simultaneously pivoting the gate to the open position with the same hand.

While the invention has been illustrated and described in detail in the drawings and in the foregoing description, it should be understood that the same are merely illustrative and the invention is not intended to be limited to the particular embodiment disclosed. One preferred embodiment has been shown and any changes and modifications that come within the spirit of the invention and the scope of the claims also are intended to be protected.

I claim:

1. A hoist hook assembly comprising a hook shaped body having a shank at one end and a tip at the other end spaced from said shank thereby forming a throat opening, a safety gate comprising a pair of distinct, substantially parallel spaced apart arms integrally connected together adjacent one end of said gate by a cap portion overlying said tip in the closed position of said gate, the opposite end of said gate being open with said arms straddling said body adjacent said shank, said gate arms being spaced from each other from said one end to said opposite end of said gate whereby said gate is open between said ends, pivot means connecting said arms at said opposite gate end to said body whereby the gate can be swung from a closed position to an open position and vice versa; and latching mechanism operable by a single hand of an operator for holding the gate in closed position and which when released enables the same single hand to swing the gate open, comprising a dogging pin between said arms, a separate casing between the ends of said arms fixedly secured thereto, said casing being completely closed except for an opening in each end thereof, said end openings slidably supporting said pin and being substantially closed by said pin, resilient means about said pin urging one end of said pin toward said shank portion, said shank portion having a notch providing a shoulder against which said pin end is engaged in said closed position of the gate, and a handle secured to the opposite end of said pin extending upwardly between said arms to provide an accessible portion engageable by one finger of said single hand whereby no portion of said hand need be inserted beneath said gate to disengage said pin from said shoulder, said pin being slidable in said casing away from said shank portion and toward said hook tip whereby said pin may be disengaged from said shoulder and said gate pivoted to the open position by the single hand of said operator in one continuous motion.

2. The hoist hook assembly of claim 1 wherein said accessible portion of said handle extends upwardly beyond the tops of said gate arms.

References Cited in the file of this patent

UNITED STATES PATENTS

| | | |
|---|---|---|
| 114,459 | Meyer | May 2, 1871 |
| 1,505,051 | Lindgreen | Aug. 12, 1924 |
| 2,091,477 | Grau | Aug. 31, 1937 |
| 2,706,318 | Coffing | Apr. 19, 1955 |

FOREIGN PATENTS

| | | |
|---|---|---|
| 12,577 | Great Britain | May 28, 1912 |